United States Patent  
Breneur et al.

(10) Patent No.: US 7,828,071 B2  
(45) Date of Patent: Nov. 9, 2010

(54) AGRICULTURAL IMPLEMENT COMPRISING AN IMPROVED HITCH STRUCTURE

(75) Inventors: David Breneur, Cellieu (FR); Gilles Fischbach, Strasbourg (FR)

(73) Assignee: Kuhn S.A., Saverne (FR)

( * ) Notice: Subject to any disclaimer, the term of this patent is extended or adjusted under 35 U.S.C. 154(b) by 154 days.

(21) Appl. No.: 12/158,478

(22) PCT Filed: Dec. 20, 2006

(86) PCT No.: PCT/FR2006/051397

§ 371 (c)(1), (2), (4) Date: Jun. 20, 2008

(87) PCT Pub. No.: WO2007/074292

PCT Pub. Date: Jul. 5, 2007

(65) Prior Publication Data

US 2008/0264654 A1  Oct. 30, 2008

(30) Foreign Application Priority Data

Dec. 22, 2005 (FR) .................................. 05 54011

(51) Int. Cl.  
*A01B 59/043* (2006.01)

(52) U.S. Cl. ........................................ 172/439; 172/311

(58) Field of Classification Search .................. 172/439, 172/311, 456, 605, 677, 679, 680, 776, 440, 172/441; 37/231, 468, 466  
See application file for complete search history.

(56) References Cited

U.S. PATENT DOCUMENTS 3,800,447 A * 4/1974 Harvey .......................... 37/236  
4,138,063 A * 2/1979 Batts ........................... 239/168  
4,164,985 A * 8/1979 Bobard ....................... 180/53.1  
4,185,445 A * 1/1980 van der Lely ..................... 56/6  
4,357,031 A * 11/1982 Berg ........................... 172/439  
4,409,780 A    10/1983 Beougher et al.  
4,659,102 A * 4/1987 Stuhrmann et al. ........... 280/481  
4,790,484 A * 12/1988 Wall ............................ 239/655  
5,392,538 A * 2/1995 Geerligs et al. ............... 37/268  
6,119,788 A * 9/2000 Bernier ........................ 172/311  
6,347,671 B1 * 2/2002 Stiller et al. ................. 172/439  
6,405,806 B1 * 6/2002 Bernhardt et al. ........... 172/272  
6,764,270 B1 * 7/2004 Bernhardt et al. ........... 414/718  
7,003,938 B2 * 2/2006 Erdmann et al. .............. 56/228  
7,222,480 B2 * 5/2007 Erdmann et al. .............. 56/228

FOREIGN PATENT DOCUMENTS

EP  0 808 557  11/1997  
EP  1 093 707   4/2001

* cited by examiner

*Primary Examiner*—Robert E Pezzuto  
*Assistant Examiner*—Matthew D Troutman  
(74) *Attorney, Agent, or Firm*—Oblon. Spivak. McClelland, Maier & Neustadt, L.L.P.

(57) ABSTRACT

An agricultural machine including a chassis, an engine, a driver's cabin, a hitch, and at least two working units connected to the hitch by a hitching frame. The at least two working units are configured to be pivoted between a working position in which the working units extend substantially horizontally and transversely to a direction of travel in work and a transport position in which the working units extend substantially over the chassis. The hitch is connected to the chassis via a rigid structure, the rigid structure connected to the chassis by a transverse articulation, at least one actuator being provided between the chassis and the rigid structure to allow the rigid structure to tip about the transverse articulation.

17 Claims, 7 Drawing Sheets

AGRICULTURAL IMPLEMENT COMPRISING AN IMPROVED HITCH STRUCTURE

BACKGROUND OF THE INVENTION

1. Field of the Invention

The present invention relates to the general technical field of agricultural machines. The invention relates to an agricultural machine comprising a chassis, an engine, a driver's cabin, a hitch and at least two working units. Said working units are connected to said hitch of said agricultural machine by a hitching frame. Said at least two working units are able to be pivoted between a working position in which said working units extend substantially horizontally and transversely to the direction of travel in work, and a transport position in which said working units extend substantially above said chassis.

2. Discussion of the Background

In the prior art, there is such a self-propelled agricultural machine fitted with several working units so as to cover a wide area and improve its productivity. Said working units may usually be placed on the front or on the rear of the agricultural machine. Such machines have a working width that can reach 9 meters. To move them on the roads, it was necessary to provide a transport position of reduced width in which the working units are pivoted to the vertical to comply with the legislation limiting the transport width to three meters.

The folding of said working units to the vertical, in order to comply with this maximum width of three meters for movements on the public highways, leads to a limitation of the working width of the working units because the machine must also comply with the height limitation of four meters. In this transport position, there is a problem relating to the positioning of the working units lifted at the front or at the rear of the machine, according to the model, which is that of stability particularly if there is wind or on uneven ground. The instability of the machine may, in certain unfavorable conditions, cause it to tip over.

For the purpose of resolving the main difficulties mentioned above, document FR 0551207 of the applicant has proposed an agricultural machine comprising a driver's cabin capable of moving and pivoting so that the machine can move in transport in a direction opposite to that of work. In transport, folding the working units on the chassis does not cause instability of the machine when driven on roads and tracks. For this, the two working units are connected to a central support. This central support is articulated on the hitching frame by means of an articulation that is horizontal and perpendicular to the direction of travel and by means of an actuator acting between the central support and the hitching frame. Therefore, the working units pivot about the horizontal articulation by means of the actuator. The working units tip over the machine.

The use of such a horizontal articulation between the central support and the hitching frame is not optimal. The agricultural machine usually carries out different types of work; for this it uses several types of working units. It is therefore necessary to provide, for each of the types of working units, an articulation and an actuator between the central support and the hitching frame allowing the working units to tip over the agricultural machine.

The object of the present invention is to overcome the aforementioned drawbacks and to propose an agricultural machine as described in the introduction that is simpler to produce.

Accordingly an important feature of the invention consists in the hitch being connected to said chassis via a rigid structure, itself connected to said chassis by means of a transverse articulation, at least one actuator being provided between the chassis and said rigid structure to allow said rigid structure to tip about the transverse articulation. The working width of the working units is therefore not limited to four meters, the height limit according to the road legislation.

The hitch of the machine makes it possible to tip working units of large dimensions into the transport position over the chassis.

The agricultural machine is therefore efficient because it has a high work rate with a reduced transport width. Such a solution is therefore very attractive. During transport, the agricultural machine according to the invention is relatively compact and it is less than four meters high, therefore within the authorized gauge. The machine is picked up and it is very stable during movements between the working zones. Because this hitch has a rigid structure, an articulation and an actuator provided on the chassis, the machine also becomes multipurpose. It can therefore be made to move several types of working units with great widths.

Such a hitch can be used both on agricultural machines having working units placed behind the chassis in its working position, and on machines having front-mounted units and comprising a driver's cabin that can be moved and can pivot 180°.

Other features and advantages of the invention will emerge from the following description with respect to the appended drawings which are given only as nonlimiting examples.

DESCRIPTION OF THE PREFERRED EMBODIMENT

Figure 1:
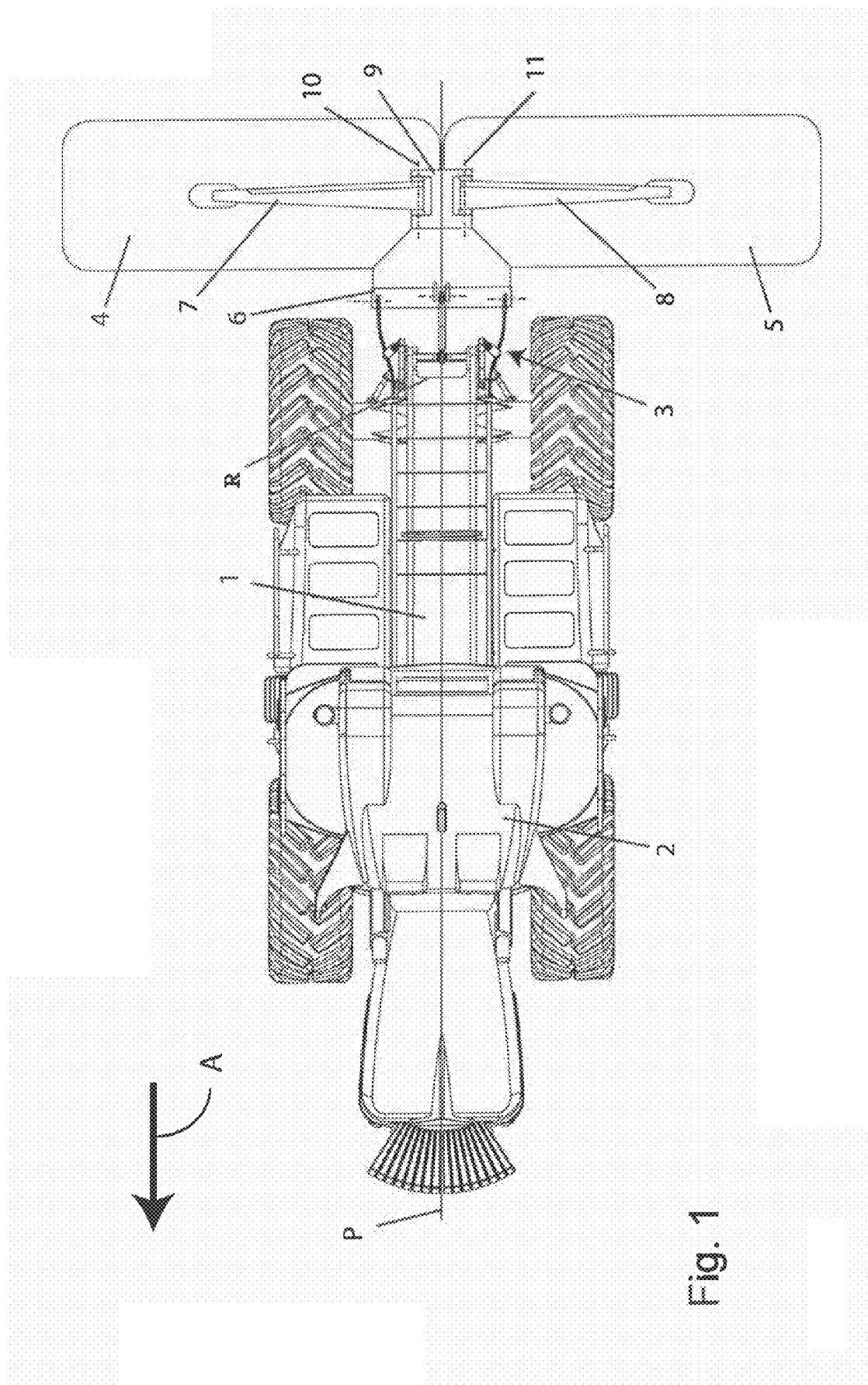
FIG. 1 is a top view of an agricultural machine having the tipping hitch, the working units being deployed for work in a field.

A first variant of a self-propelled agricultural machine able to make use of the invention is illustrated in FIG. 1. The agricultural machine comprises a chassis (1) resting on the ground by means of four wheels, an engine, a driver's cabin (2), a hitch (3) and working units (4, 5) connected to the hitch (3). The agricultural machine is therefore autonomous. The agricultural machine is made to move in a direction and line of travel (A). It is designed to drive and at least partially support the working units (4, 5). The driver's cabin (2) is oriented in the direction (A) and makes it possible to steer the whole vehicle (1) in the direction of travel (A). This direction of travel during work (A) is the same as that for transport.

In the working position shown in FIG. 1, the working units (4, 5) are positioned at the rear of the agricultural machine and symmetrically on either side of the vertical midplane (P) of the machine. The working units (4, 5) extend substantially horizontally and transversely to the direction of travel in work (A). The working units (4, 5) are connected to the hitch (3) by a hitching frame (6).

Each working unit (4, 5) with its carrying arm (7, 8) is connected in a pivoting manner to a central support (9) by means of a respective articulation (10, 11) whose axis is directed in the direction of travel (A). Said central support (9) being connected to the hitching frame (6). Maneuvering members, for example cylinders (not shown), are provided designed to pivot the working units (4, 5) about each respective articulation (10, 11) from a substantially horizontal working position to a vertical position and vice versa. In the vertical position, the working units (4, 5) are preferably placed symmetrically relative to the vertical midplane (P) of the machine. The respective articulations (10, 11) are positioned so that, in the vertical position, the working units (4, 5) do not exceed the width authorized for traveling on the public road. The agricultural machine also complies with the maximum authorized width.

In the light of FIG. 1, it can be seen that the hitch (3) is placed at the rear of the agricultural machine taking account of the direction of travel (A). At the rear of the driver's cabin (2) on the chassis (1) of the agricultural machine, a space is cleared for placing the working units (4, 5) when the latter are folded.

Figure 2:
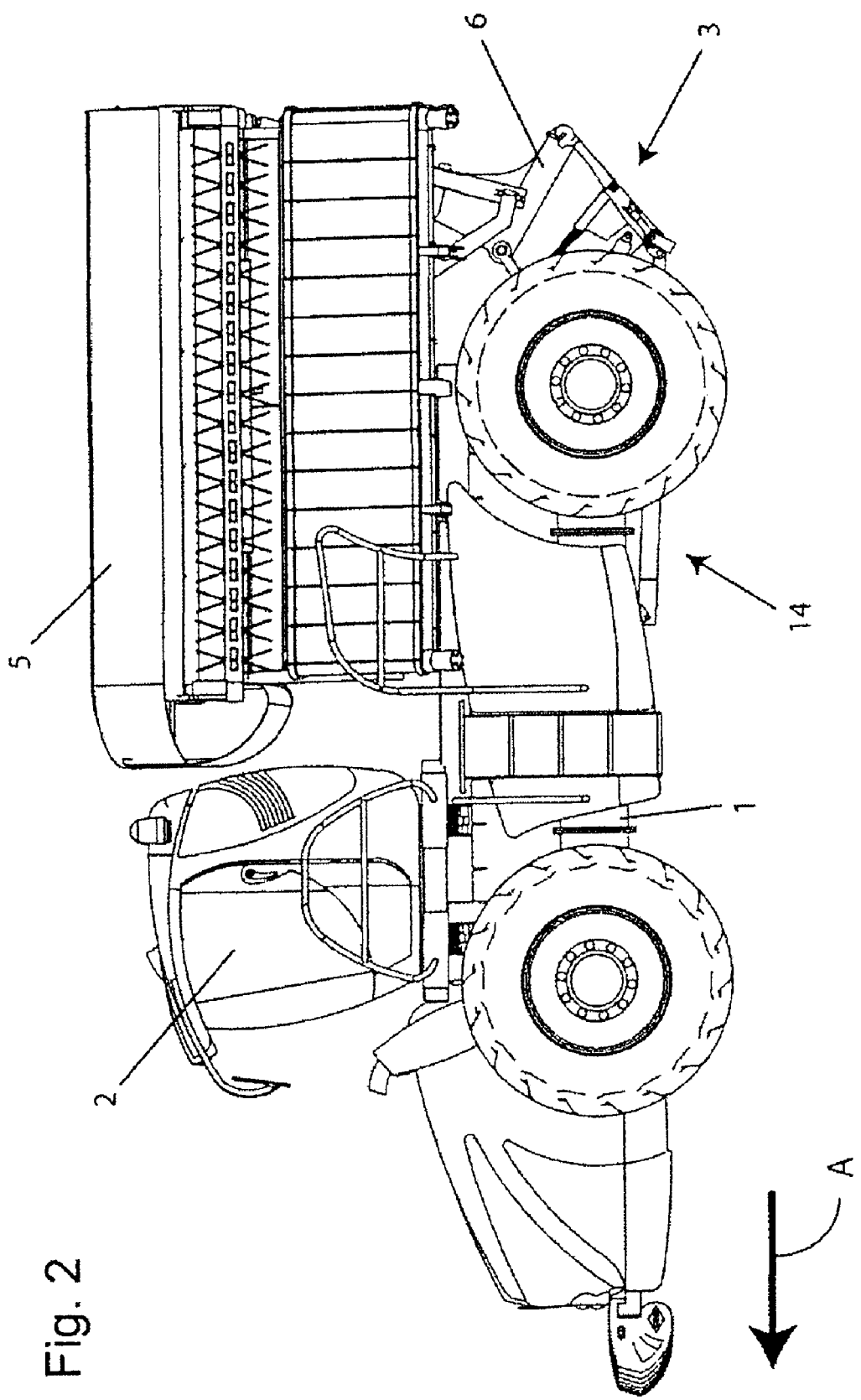
FIG. 2 is a side view of the same agricultural machine in a transport position in which the working units have been folded over the chassis.

The transition from the working position, illustrated in FIG. 1, to the transport position, illustrated in FIG. 2, takes place essentially in two steps. In a first step, the working units (4, 5) are folded to the vertical by means of hydraulic cylinders about articulations (10, 11), as described above. In a second step, the hitch (3) pivots 90° to bring the working units (4, 5) folded to the vertical in a transport position in which the working units (4, 5) extend substantially over the chassis. Advantageously, the working units (4, 5) extend in a horizontal plane parallel to the direction of travel (A), as is illustrated in FIG. 2.

According to an important feature of the invention, the hitch (3) is connected to the chassis (1) by means of a rigid structure (12). The rigid structure (12) is connected to the chassis (1) by means of a transverse articulation (13). Provided between the chassis (1) and the rigid structure (12) is at least one actuator (14) which allows the rigid structure (12) to tip about the transverse articulation (13).

The transverse articulation (13) is placed in the upper part of the rigid structure (12). The hitch (3) may therefore tip between a working position in which the working units (4, 5) extend substantially horizontally and transversely to the direction of travel in work (A) and a transport position in which the working units (4, 5) extend substantially over the chassis (1), and vice versa. The hitch (3) is able to pivot about the transverse articulation (13) by a value of approximately 90°. The agricultural machine therefore complies with the maximum height authorized for traveling on the public road. The transverse articulation (13) advantageously has an axis that is substantially horizontal and substantially perpendicular to the direction of travel (A). The actuator (14) extends directly underneath the chassis (1) of the agricultural machine so as not to limit the ground clearance of the agricultural machine. The lengthening of the actuator (14) causes the rigid structure (12) to tip into the transport position.

To prevent at least partially the transmission to the chassis (1) of the forces sustained by the working units (4, 5) during work, the machine is fitted with a damping device. With a damping device, the chassis (1) and the hitch (3) will therefore be less stressed. The damping device is installed between the chassis (1) and the rigid structure (12). It would therefore be possible to envisage at least one elastic element in the lower part of the rigid structure (12). This elastic element also forms an abutment for the working position of the hitch (3). Another solution is to envisage mounting an oleopneumatic accumulator on the actuator (14) to perform the damping function.

Provision could be made to use the actuator (14) to travel from the working position of the working units (4, 5) to the maneuvering position in which the working units (4, 5) are distant from the ground. The actuator (14) is, for example, lengthened to mid-travel to move the working units (4, 5) away from the ground by pivoting about the transverse articulation (13).

Figure 3:
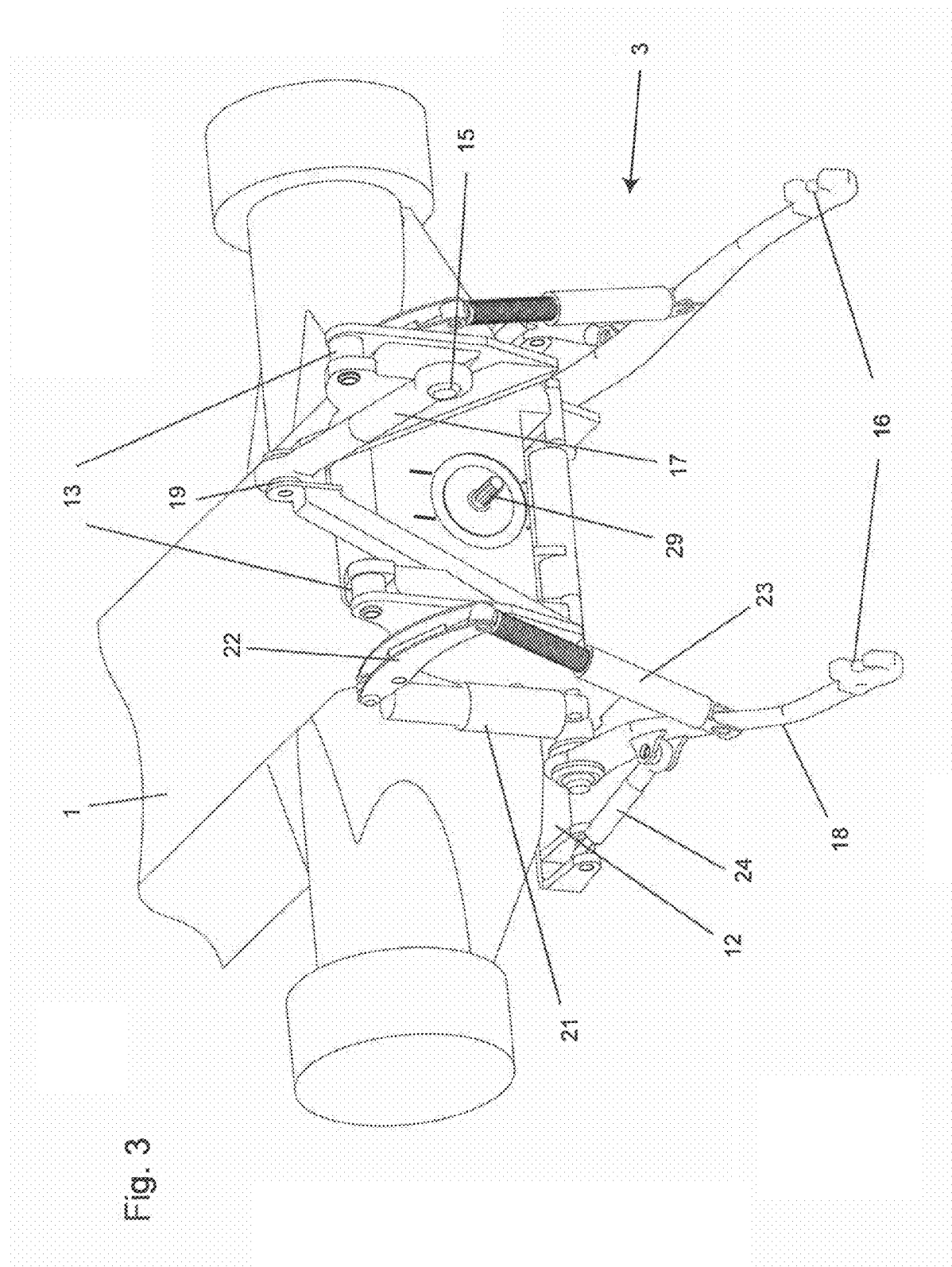
FIG. 3 illustrates the rear part of the agricultural machine in perspective.

FIGS. 3 to 6 illustrate the rear part of the agricultural machine and more particularly a three-point hitch. FIG. 3 shows the three-point hitch (3) in perspective. In this representation, the actuator (14) is not visible and the hitching frame (6) of the working units (4, 5) is not represented.

Such a three-point hitch is known per se. It comprises an upper hitching point (15) and two lower hitching points (16). These hitching points (15, 16) make it possible to couple the hitching frame (6). The upper hitching point (15) extends in the vertical midplane (P) and the two lower hitching points (16) extend under and on either side of the vertical midplane (P). The hitching frame (6) of the working units (4, 5) is coupled to the chassis (1) via the hitch (3). For this purpose, the hitch (3) comprises an upper bar (17) and two lower bars (18). The upper bar (17) is articulated on the rigid structure (12) by means of an upper articulation (19). The other end of the upper bar (17) is designed to be connected to the hitching frame (6) via the upper hitching point (15). Each lower bar (18) is articulated on the rigid structure (12) by means of a respective lower articulation (20). Each lower bar (18) is designed to be connected to the hitching frame (6) via the corresponding lower hitching point (16).

The three-point hitch (3) must have the usual functionalities. Conventionally, the hitch (3) must be able to be moved between a working position in which the working units (4, 5) extend in the vicinity of the ground and transversely to the direction of travel (A) and a position in which the working units (4, 5) are distant from the ground to make the headland maneuvers easier. To carry out this movement, at least one lift cylinder (21) is therefore provided which acts between the rigid structure (12) and the lower bar (18) of the hitch (3). The connection between the lift cylinder(s) (21) and the respective lower bar (18) is achieved by means of a lift arm (22) and a lift link rod (23). The lift cylinder (21) is rigidly fastened to the rigid structure (12). The latter extends substantially vertically whereas the lift arm (22) is substantially horizontal. The lift arm (22) is of the tipper type articulated between the lift cylinder (21) and the lift link rod (23). The lift link rod (23) is adjustable in length. The lift cylinder (21) makes it possible to lower or raise the corresponding lower hitching point (16) in order to pass from a working position to a raised maneuvering position. Thanks to these elements (17, 18, 21, 22, 23), the working units (4, 5) are moved away from the ground in a substantially vertical translation movement. Also provided is at least one stabilizer (24) which acts between the rigid structure (12) and the respective lower bar (18) of the hitch (3). This stabilizer (24) limits the lateral movement of the lower bar (18) and consequently the lateral movement of the hitch (3). Each stabilizer (24) is adjustable in length.

Figure 4:
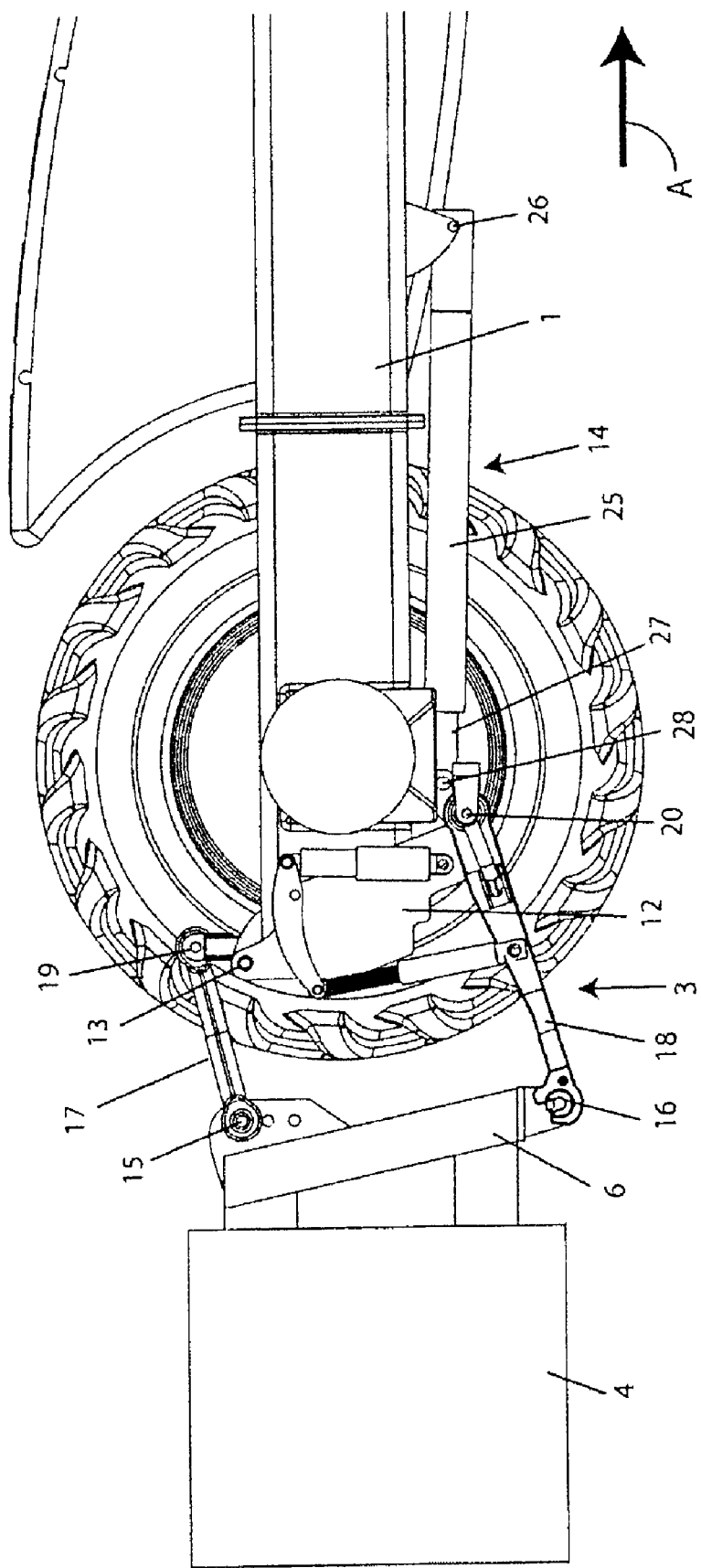
FIG. 4 shows, in a side view, the hitch in the working position with the working units in work.
Figure 5:
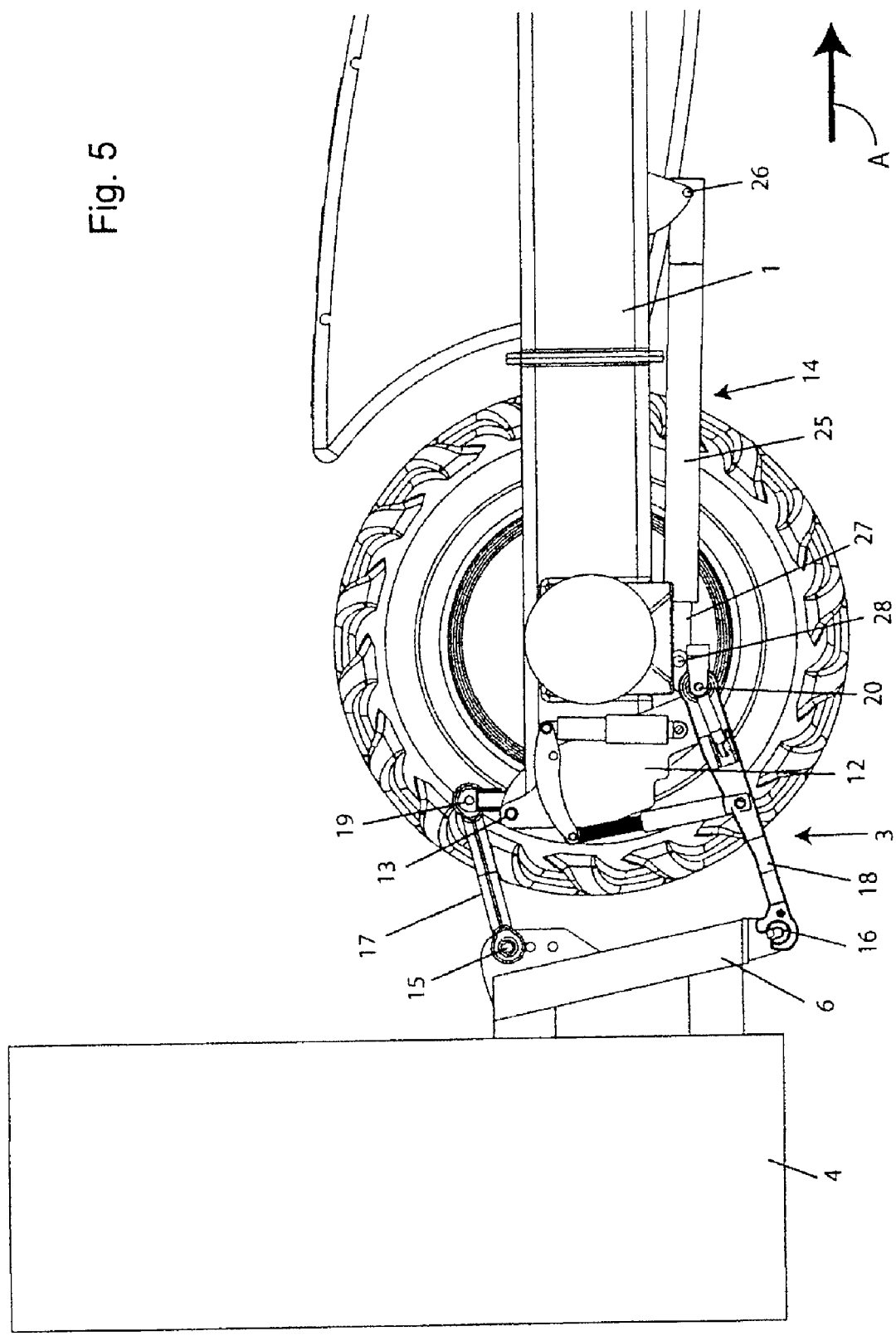
FIG. 5 shows, in a side view, the hitch in the working position with the working units folded to the vertical.
Figure 6:
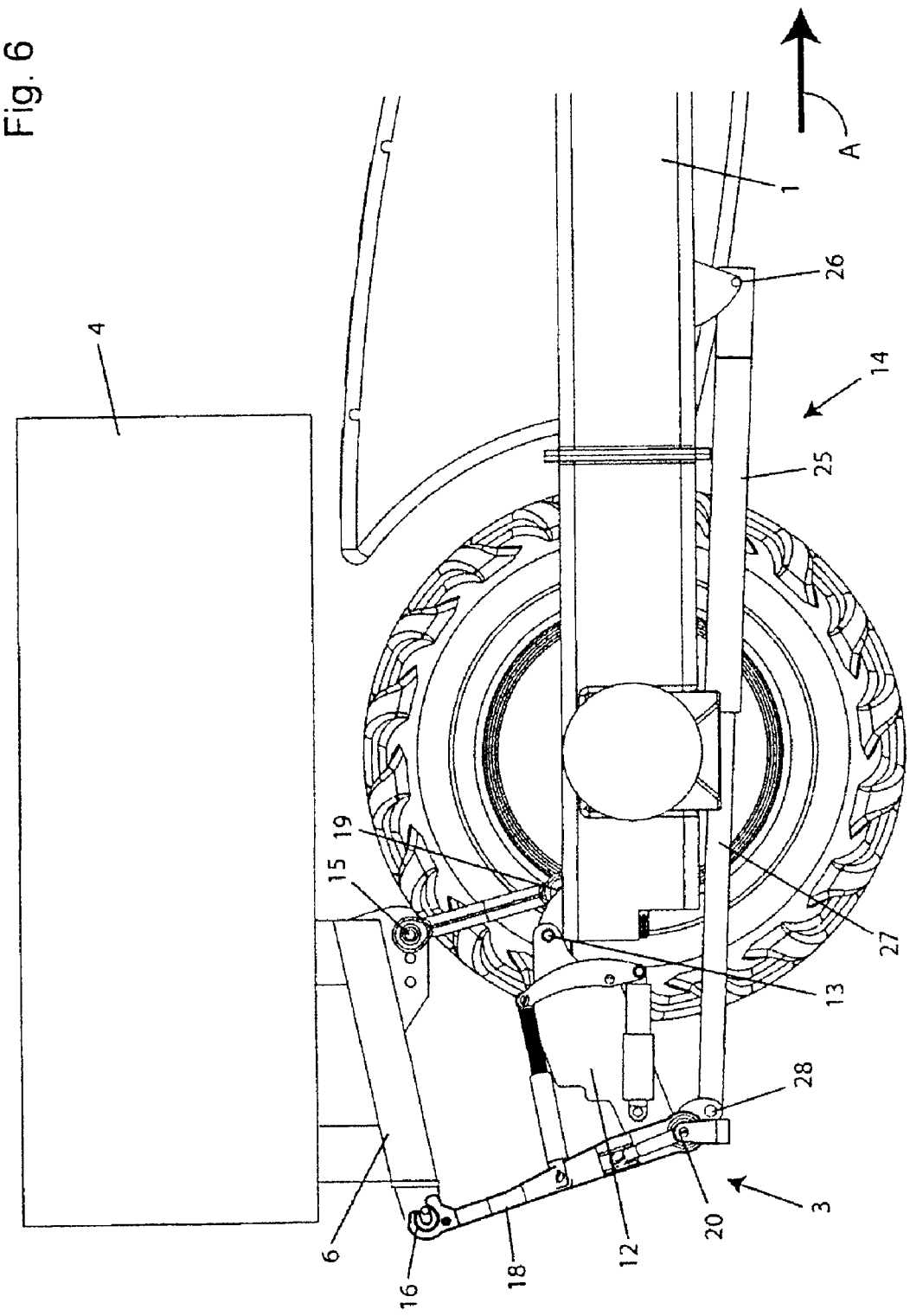
FIG. 6 illustrates, in a side view, the hitch in the transport position with the working units folded.
Figure 7:
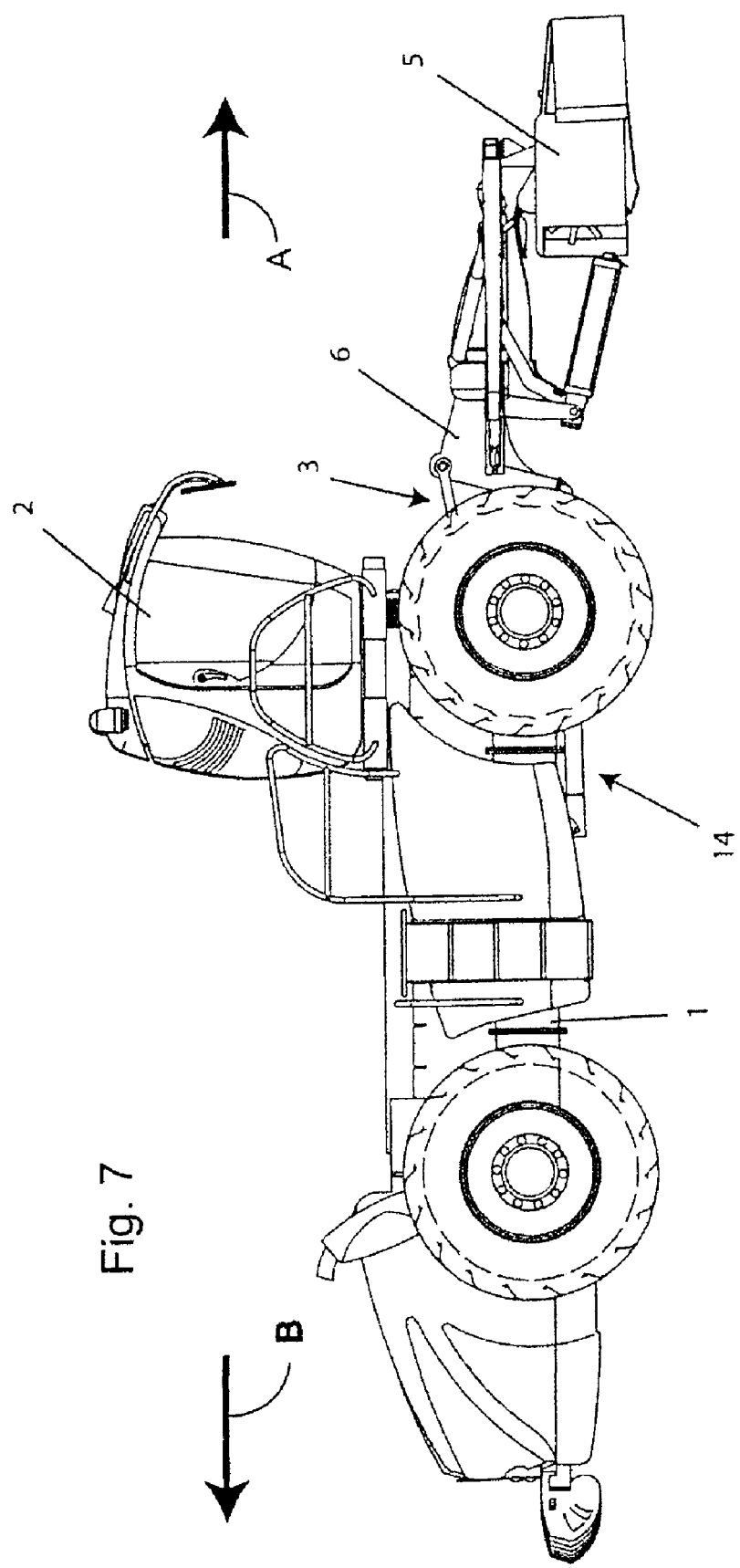
FIG. 7 shows, in a side view, a second variant of an agricultural machine according to the invention.

According to FIG. 4, the transverse articulation (13) extends in the upper part of the rigid structure (12) and more particularly in the vicinity of the upper articulation (19). Preferably, the upper articulation (19) is situated substantially above the transverse articulation (13) connecting the rigid structure (12) to the chassis (1). The upper articulation (19) is again situated substantially in front of the transverse articulation (13) taking account of the direction of travel (A). The actuator (14), extending underneath the chassis (1), allows the rigid structure (12) to pivot about the transverse articulation (13) in order to tip the hitch (3) 90° into the transport position. It is important that the actuator (14) does not limit the ground clearance of the machine in order to prevent impacts and for passing over obstacles during movements on the road and in the fields. It is therefore placed directly underneath the chassis (1). In the exemplary embodiment shown, the actuator (14) acts in a single point of the rigid structure (12); advantageously this point is placed in the vertical midplane (P). However, it can be envisaged to place two actuators (14) or even more, acting in various points of the rigid structure (12), for example on the sides and if necessary in the center, so as to distribute the applied forces necessary for the tipping. In the light of FIGS. 4 to 6, the actuator (14) comprises a body (25) connected to the chassis (1) by means of a first articulation (26) with an axis that is substantially horizontal and perpendicular to the direction of travel (A). The actuator also comprises a rod (27) connected to the rigid structure (12) by means of a second articulation (28) with an axis that is substantially horizontal and perpendicular to the direction of travel (A). The rod (27) of the actuator (14) is long enough to allow the hitch (3) to tip 90°. The ground clearance must be acceptable irrespective of the position of the rod (27). The second articulation (28) is positioned so that, when the rigid structure (12) tips 90°, the latter does not come into contact with the ground and in addition remains at a certain distance from the ground. The second articulation (28) extends into the lower part of the rigid structure (12). The first articulation (26) and the second articulation (28) are placed in the vertical midplane (P) of the agricultural machine.

In the working position, FIG. 4, the transverse articulation (13) extends substantially behind and substantially underneath the upper articulation (19). The second articulation (28) extends substantially in front of and substantially above the lower articulations (20). During work, the rod (27) of the actuator (14) is retracted and the hitch (3) operates like a standard three-point hitch, described above. In the transport position, the rigid structure (12) has tipped approximately 90° about the transverse articulation (13). The upper articulation (19) has pivoted forward and is positioned substantially underneath the transverse articulation (13). The chassis has a recess (R) (see FIG. 1) allowing the upper bar (17) to pivot in the transport position.

The transition from the working position to the transport position is illustrated in FIGS. 4, 5 and 6.

FIG. 4 represents the working position in which the working units (4, 5) are placed transversely to the direction of travel (A) and preferably in the extension of one another. FIG. 5 represents the position in which the working units (4, 5) have been moved to the vertical and are placed symmetrically relative to the vertical midplane (P). FIG. 6 represents the transport position in which the working units (4, 5) are placed over the chassis (1). The transition from the working position to the vertical position of the working units (4, 5) has been described above.

Starting from the vertical position of the working units (4, 5), represented in FIG. 5, from the driver's cabin (2) the user commands the lengthening of the actuator (14) which causes the rigid structure (12) to tip about the transverse articulation (13) to bring the working units (4, 5) from the vertical position to a horizontal position over and substantially on the chassis (1). The rigid structure (12) must support the weight of the working units (4, 5) and of the hitching frame (6) during the tipping.

Preferably placed on the rigid structure (12) are various elements that can ensure the safety of the hitch (3) in the transport position. Such means are, for example, locking devices that prevent the hitch (3) from moving about the transverse articulation (13) when the hitch (3) is in the transport position. Various means may be envisaged for these safety devices without departing from the context of the invention.

In the light of FIG. 3, it can be seen that a transverse articulation (13) is placed on either side of the vertical midplane (P). This makes it possible to obtain better stability during the tipping of the hitch (3).

The actuator (14) may be a single-acting or double-acting hydraulic cylinder. In a particularly advantageous manner, the cylinder is double-acting. Therefore, when the working units (4, 5) are folded onto the chassis (1), any untoward movement of the assembly is prevented during transport. Safety is improved.

The transition from the transport position to the working position allowing the working units (4, 5) to operate takes place according to the process that is the reverse of that previously described, after the necessary safety means have been unlocked.

The agricultural machine according to the invention fitted with the hitch (3) is efficient because it can carry working units (4, 5) of large dimension and can travel on the roads since, in transport, it will comply with the road gauge. With such a hitch (3), the agricultural machine is multipurpose; it can receive various types of working units (4, 5). Therefore, the self-propelled machine can receive at least two mowers with a large working width. The working unit (4, 5) can, according to use, rather be a mower-conditioner, a shredder, a rotary harrow, a windrower or a toothed implement, etc.

In order to be able to drive the working units (4, 5), the agricultural machine has a power take-off (29) which allows the transmission of power from the engine to the working units (4, 5). The transmission is achieved by means of mechanical transmission elements such as a telescopic shaft with double universal joints fitted with a wide angle cardan joint, the wide angle of operation allowing the hitch (3) to be tipped 90°. The transmission may also combine mechanical and hydraulic transmission elements. Therefore, the power take-off (29) of the machine drives a hydraulic pump that is installed on board the working unit. Such a transmission reduces upkeep and maintenance.

FIG. 6 illustrates a second variant of a self-propelled agricultural machine according to the invention. This type of machine is described in application FR 0551207 of the applicant. It comprises working units (4, 5) placed frontally for work, when the machine is moving in the direction of work (A).

To pass to the transport position, the driver's cabin (2) is pivoted 180° and is moved to the opposite end from the working units (4, 5) on the chassis (1). Said working units (4, 5) are folded in the same manner as in the variant previously described. In the transport position, this particular type of agricultural machine moves in the direction (B) opposite to the direction of work (A). The machine is shown in this transport position also according to the representation of FIG. 2.

The above description refers to the folding of two working units (4, 5) carried by the hitch (3). It is envisaged in the context of the invention to position more than two working units, for example three, and provide an appropriate folded configuration. Assuming three working units, provision may for example be made to use two large-dimension side units on either side of a central, reduced-dimension unit, typically of the width of the agricultural machine.

The transition to the transport position is carried out by rotating the hitch (3) after folding the two side units to the vertical on either side of the central unit. In transport, the side units are situated substantially over the chassis (1) and in a plane that is horizontal and parallel to the direction of travel (B) while the central working unit still remains perpendicular to the direction of travel (A, B). The central working unit is, in the transport position, raised and extends to the rear of the chassis (1). The operation of the tipping hitch (3) remains identical.

It can be envisaged to use various subsidiary means such as abutments, dampers, stabilizers, etc. so that the hitch (3) can operate in total safety irrespective of the working and transport positions encountered and in order to pass from one position to another without risk for the user and the equipment. In particular, provision is made to use means preventing the movements about the transverse articulation (13) when the hitch (3) is in a determined working or transport position so as to lock any undesired tipping of the hitch (3).

It is also possible to provide a hitch that comprises a single upper hitching point (15) and a single lower hitching point (16). Another hitch would comprise two upper hitching points (15) and two lower hitching points (16).

According to the exemplary embodiment shown, naturally, the invention is not limited to the embodiments described and represented as examples, but it also comprises all the technical equivalents and their combinations.

The invention claimed is:

1. An agricultural machine comprising:
a chassis;
an engine;
a driver's cabin;
a hitch; and
at least two working units connected to the hitch by a hitching frame, the at least two working units configured to be pivoted between a working position in which the working units extend substantially horizontally and transversely to a direction of travel in work and a transport position in which the working units extends substantially above the chassis,
wherein the hitch is connected to the chassis via a rigid structure, the rigid structure connected to the chassis by a transverse articulation, at least one actuator being provided between the chassis and the rigid structure to allow the rigid structure to tip about the transverse articulation,
wherein the actuator extends directly underneath the chassis of the agricultural machine,
wherein the transverse articulation is connected to the rigid structure closer to a top of the rigid structure than to a bottom of the rigid structure, in the working position, and
wherein the hitch is a three-point hitch comprising an upper bar connected to the rigid structure by an upper articulation and two lower bars each connected to the rigid structure by a respective lower articulation.

2. The agricultural machine as claimed in claim 1, wherein the hitch is configured to pivot about the transverse articulation by a value of approximately 90°.

3. The agricultural machine as claimed in claim 1, wherein the transverse articulation has an axis that is substantially horizontal and substantially perpendicular to the direction of travel.

4. The agricultural machine as claimed in claim 1, wherein the actuator is configured such that its lengthening causes the rigid structure to tip into the transport position.

5. The agricultural machine as claimed in claim 1, wherein the hitch is a three-point hitch comprising an upper bar connected to the rigid structure by an upper articulation and two lower bars each connected to the rigid structure by a respective lower articulation.

6. The agricultural machine as claimed in claim 1, wherein, in the working position, the upper articulation is situated substantially above the transverse articulation connecting the rigid structure to the chassis.

7. The agricultural machine as claimed in claim 1, wherein, in the transport position, the upper articulation is situated substantially in front of the transverse articulation considering the direction of travel in transport.

8. The agricultural machine as claimed in claim 1, wherein the chassis includes a recess allowing the upper bar to pivot in the transport position.

9. The agricultural machine as claimed in claim 1, further comprising at least one lift cylinder, acting between the rigid structure and the respective lower bar of the hitch.

10. The agricultural machine as claimed in claim 9, wherein the connection between the at least one lift cylinder and the respective lower bar is achieved by a lift arm and a lift link rod.

11. The agricultural machine as claimed in claim 10, wherein the lift link rod is adjustable in length.

12. The agricultural machine as claimed in claim 1, further comprising at least one stabilizer, acting between the rigid structure and the respective lower bar of the hitch.

13. The agricultural machine as claimed in claim 12, wherein the stabilizer is adjustable in length.

14. The agricultural machine as claimed in claim 1, further comprising safety means preventing the hitch from moving in rotation about the transverse articulation when the transverse articulation is in the transport position.

15. The agricultural machine as claimed in claim 14, wherein the safety means comprises the actuator, and the actuator includes a double-acting cylinder.

16. The agricultural machine as claimed in claim 1, wherein the at least two working units comprise at least two mowers.

17. The agricultural machine as claimed in claim 1, wherein the at least two working units are disposed behind the driver's cabin with respect to the direction of travel while the work units are in the transport position.

* * * * *